United States Patent
Eidson

(10) Patent No.: US 8,854,924 B2
(45) Date of Patent: Oct. 7, 2014

(54) METHOD, A DEVICE AND A SYSTEM FOR EXECUTING AN ACTION AT A PREDETERMINED TIME

(75) Inventor: John C Eidson, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 2030 days.

(21) Appl. No.: 11/926,142

(22) Filed: Oct. 29, 2007

(65) Prior Publication Data

US 2009/0109797 A1 Apr. 30, 2009

(51) Int. Cl.
*G04B 47/00* (2006.01)
*H04W 24/10* (2009.01)

(52) U.S. Cl.
CPC ..................................... *H04W 24/10* (2013.01)
USPC ............... 368/10; 368/11; 368/276; 368/281; 368/300; 368/309; 340/870.02; 340/309.16

(58) Field of Classification Search
USPC .......................................... 368/10; 710/6, 58
See application file for complete search history.

(56) References Cited

U.S. PATENT DOCUMENTS

| | | | | |
|---|---|---|---|---|
| 5,887,029 A * | 3/1999 | Husted et al. | ................. | 375/224 |
| 6,741,952 B2 * | 5/2004 | Eidson | ......................... | 702/187 |
| 6,759,884 B2 * | 7/2004 | Tomita | ......................... | 327/277 |
| 6,965,800 B2 * | 11/2005 | Schmit et al. | ................... | 700/29 |
| 7,085,848 B2 * | 8/2006 | Cabrera et al. | ................ | 709/232 |
| 7,114,091 B2 * | 9/2006 | Vrancic | ......................... | 713/400 |
| 7,263,035 B2 * | 8/2007 | Emery | ............................ | 368/10 |
| 7,454,681 B2 * | 11/2008 | Reichert et al. | ............... | 714/744 |
| 7,561,598 B2 * | 7/2009 | Stratton et al. | ................ | 370/507 |
| 7,917,784 B2 * | 3/2011 | de Cesare et al. | ............. | 713/320 |
| 7,940,875 B2 * | 5/2011 | Pleasant et al. | .............. | 375/356 |
| 2004/0083477 A1 * | 4/2004 | Acharya et al. | ............... | 718/102 |
| 2006/0123297 A1 * | 6/2006 | Reichert et al. | ............... | 714/731 |

\* cited by examiner

*Primary Examiner* — Daniel Wu
*Assistant Examiner* — Son M Tang

(57) ABSTRACT

A method of executing an action at a predetermined time by a device is disclosed. The device has a latency time between initiation of the execution of the action and the actual execution of the action. The method includes advancing the initiation of the execution of the action by the latency time. A device in which the method is implemented and a system including the device are also disclosed.

19 Claims, 4 Drawing Sheets

METHOD, A DEVICE AND A SYSTEM FOR EXECUTING AN ACTION AT A PREDETERMINED TIME

BACKGROUND

During testing of a device-under-test (DUT) using a number of test instruments, it is sometimes desirable to synchronize tasks on the various instruments so that the tasks are carried out at the same time. Examples of such tasks are those required for measuring the root-mean-square (RMS) power of a DUT in response to a stimulus signal, where a voltage measurement and a current measurement are made simultaneously and preferably at a known time. To make such a measurement in the prior art, a test system 2 in FIG. 1 is used. The test system 2 includes an LXI function generator 4 and two LXI digital multimeters (DMMs) 6, 8 connected to each either via a local area network (LAN) 10. Each of these instruments can accept downloaded user-specified application code and includes an IEEE 1588 clock that is synchronized with the other clocks in the test system using the IEEE 1588 time synchronization protocol. Discrepancies in the clocks in the different instruments can be reduced to less than 50 ns. All the instruments will be able to send time-stamped data to one another using peer-to-peer messages. Time-based triggers can also be set in these instruments. A time-based trigger is analogous to an alarm clock—it can be set to "go off" at a predetermined time. At that time, the instrument can be programmed to perform a specific function. This feature allows the different instruments in a test system to execute complex sequences of events autonomously, without intervention by a system controller. The use of time-based triggers requires the ability to schedule instrument actions in advance.

FIG. 2 is a general block diagram of a DMM 6, 8 in FIG. 1. The DMM includes a central processing unit (CPU) 12 and a measurement front-end 14 that is controlled by the CPU 12 to make a measurement. To obtain a power measurement, the function generator 4 generates a stimulus signal and sends a trigger message to the DMM 6, 8 triggering the DMM 6, 8 to make a measurement. When the DMM 6, 8 receives the trigger message for example at a time T1 as shown in FIG. 3, the CPU 12 executes a program in the DMM 6, 8 to parse and interpret the received trigger message. It is not until a short time later, at a time T2, that the CPU 12 is able to generate a trigger to the measurement front-end for it to make a measurement. Due to latency in the front-end 14 itself, the DMM 6, 8 actually makes the measurement at a time T3, which is a further time interval from the time T2. Thus, there is a delay within the DMM 6, 8 between receiving the trigger message and making the actual measurement. The propagation of the message through the network from the function generator to the DMM further adds to the delay between sending of the message by the function generator and making of the measurement by the DMM. However, as far as the function generator 4 is concerned, the DMM 6, 8 is expected to make the measurement when the message from the function generator 4 is received by the DMM 6, 8 at time T1. But due to both software and hardware latencies in the DMM 6, 8, the DMM 6, 8 is only able to make the measurement at time T3. The latency in the DMM 6, 8 is thus the time interval between time T3 and time T1. The latencies in the different DMMs 6, 8 in FIG. 1 and propagation delays in the network may cause the two DMMs 6, 8 to make respective measurements at different points in time although the trigger message is sent by the function generator 4 to both DMMs 6, 8 at the same time.

FIG. 4 shows a detailed block diagram of a DMM 6, 8 in FIG. 1. In addition to the CPU 12 and the measurement front-end 14, the DMM 6, 8 is now shown to include a IEEE 1588 clock 16, an execute time register 18 and a time comparator 20 for a different mode of operation. The sequence 30 of operations in the function generator 4 and the DMMs 6, 8 is next described with the aid of FIG. 5. To ensure that the DMMs 6, 8 make their respective measurements at the same point in time T3, the function generator 4 generates a stimulus signal and sends an event message to the two DMMs 6, 8 that includes a time T0 from which the DMMs 6, 8 obtain the time T3. This time T0 may be a time some event occurred or will take place in the function generator. When for example DMM1 4 receives the message at a time T1, the CPU 12 executes a program in DMM1 4 to parse and interpret the received message. The CPU 12 will modify the time T0 based on previously received instructions provided by a user to, for example, make a measurement precisely at a time T3 given by T0+TD, where TD is some application specific delay. A short time later, at a time T2, before the time T3, the CPU 12 loads the time T3 into the execute time register 18. The time comparator 20 compares the time in the execute time register 18 with the time from the IEEE 1588 clock 16. When the time in the execute time register 18 matches that of the IEEE 1588 clock 16, the comparator 20 sends a trigger to the measurement front-end 14 for it to make a measurement. Again due to latency in the front-end 14 itself, DMM1 6 actually makes the measurement at a time T4, which is a further time interval from the time T3. Thus, there is a still a latency in DMM1 6 between the time T4 and the time T3 even though the function generator 4 expects the measurement to be made at time T3. DMM2 8 may have a different latency resulting in the measurement being made at a time T5. Consequently, not only are the DMMs 6, 8 unable to make their respective measurements at the expected time T3, the DMMs 6, 8 might not be making their respective measurements at the same point in time.

BRIEF DESCRIPTION OF DRAWINGS

The invention will be better understood with reference to the drawings, in which.

DETAILED DESCRIPTION OF THE EMBODIMENTS

Figure 1:
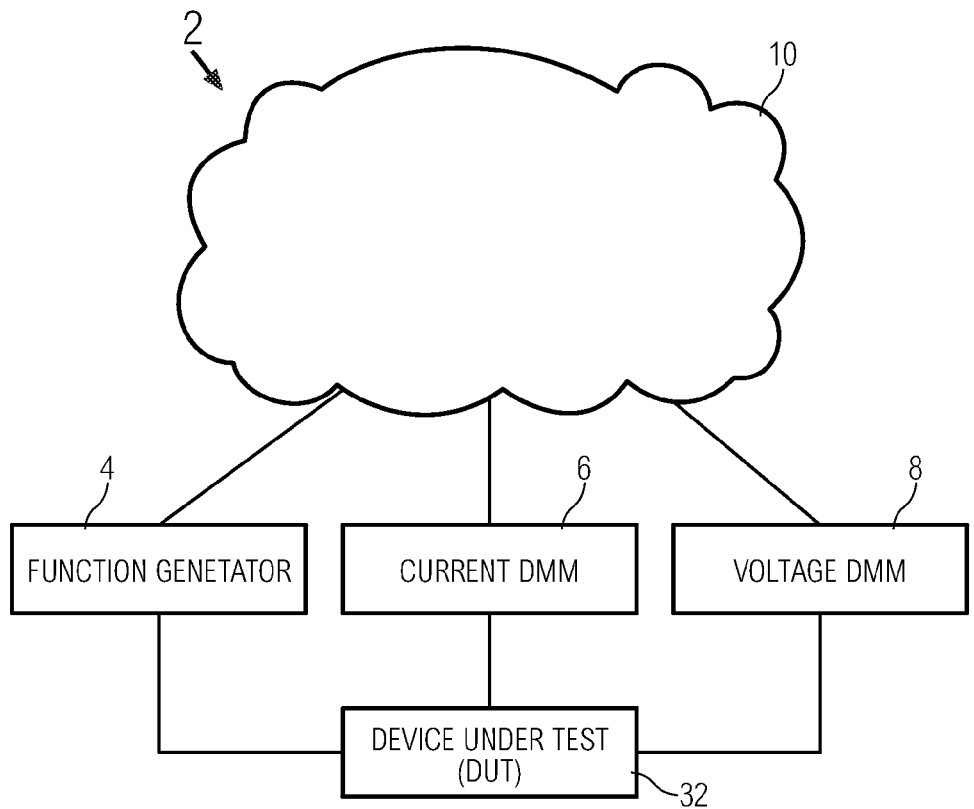
FIG. 1 is a block diagram of a prior art test system for measuring the RMS power at a device under test (DUT) in response to a stimulus signal, the test system including a function generator and two digital multimeters (DMMs)
Figure 2:
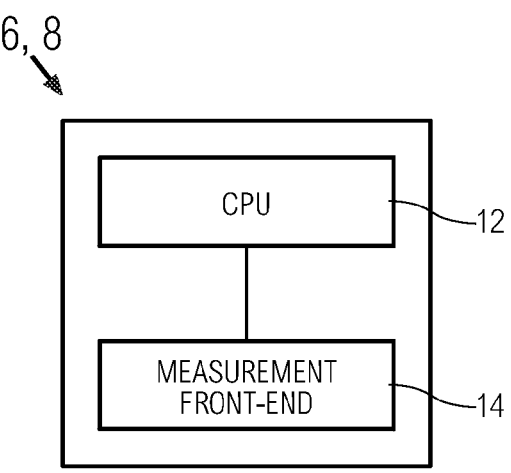
FIG. 2 is a block diagram of a prior art DMM of FIG. 1 for illustrating a first mode of operation thereof.
Figure 3:
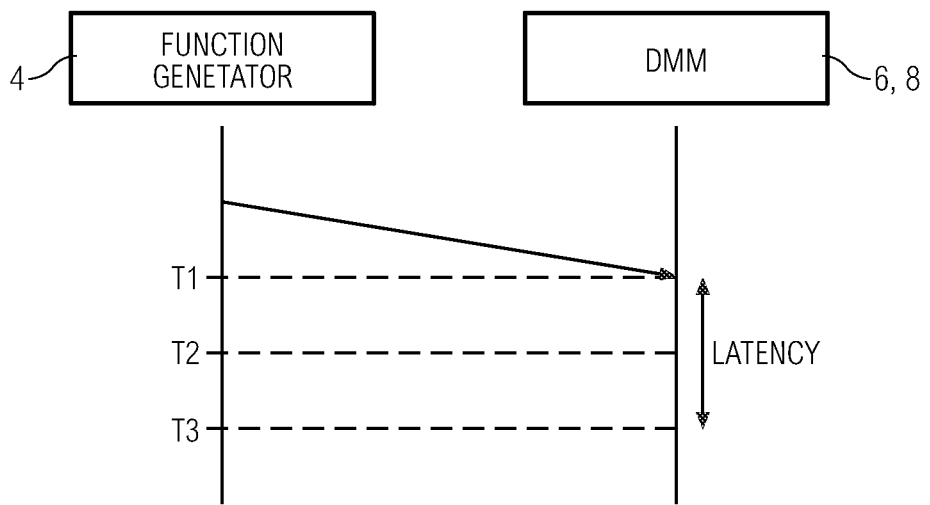
FIG. 3 is a drawing showing a sequence of operations in the test instruments in the test system of FIG. 1 for making a measurement according to the first mode of operation.
Figure 4:
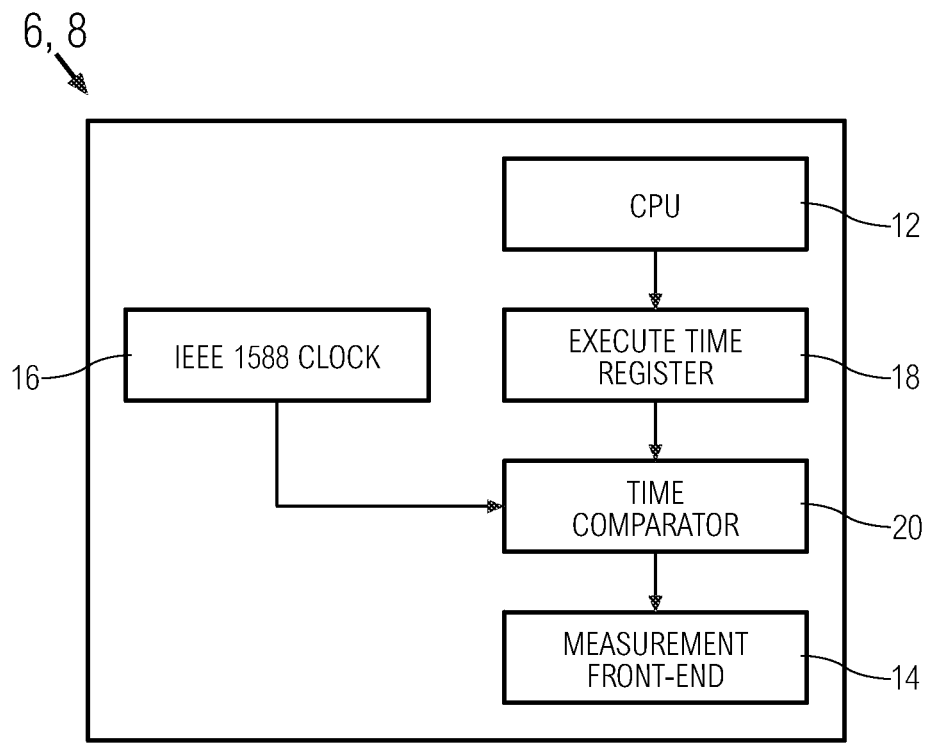
FIG. 4 is a block diagram of the prior art DMM of FIG. 1 for illustrating a second mode of operation thereof.
Figure 5:
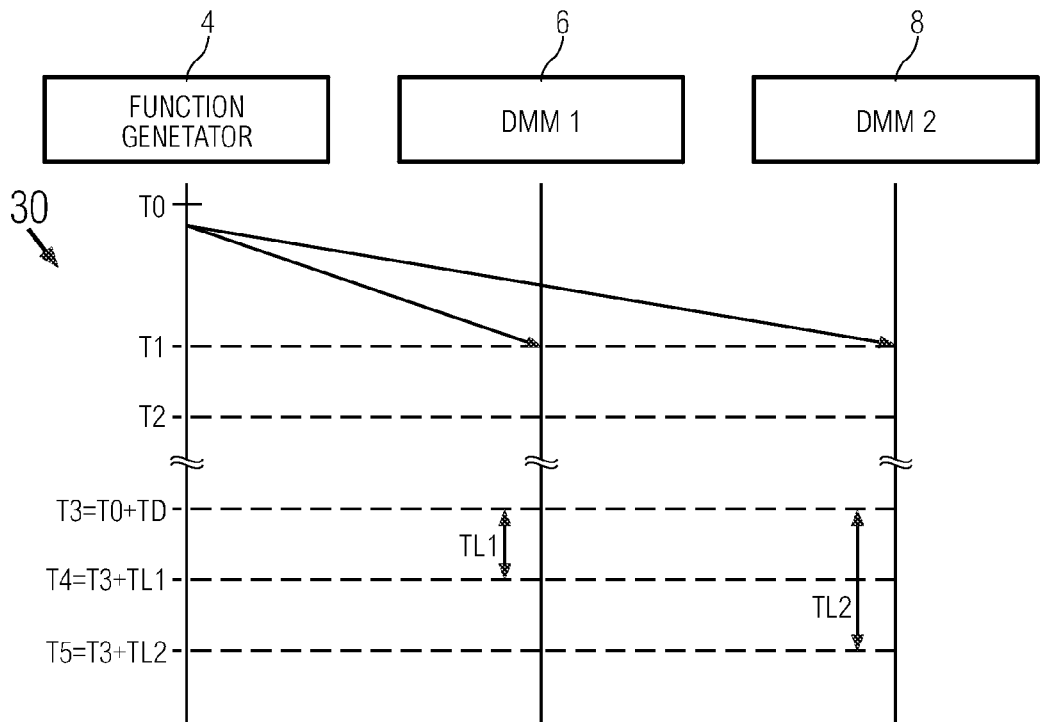
FIG. 5 is a drawing showing a sequence of operations in the test instruments in the test system of FIG. 1 when making a measurement according to the second mode of operation.

As shown in the drawings for purposes of illustration, the invention is embodied in a novel method for executing an action at a predetermined time by a device that has a latency time between the initiation of execution of the action and the actual execution of the action. The method involves advancing the initiation of the execution of the action by the latency time so that the device actually executes the action at the predetermined time. Using the method, the device is able to locally adjust, or more precisely, bring forward the initiation of execution of the action so that the actual execution of the action happens at a time that is closer to or exactly at the predetermined time.

At a system level, the test system that embodies the above described method is similar to the prior art test system 2 shown in FIG. 1. At a device level, the devices 4, 6, 8 however differ from those in the prior art as will be described shortly. The system 2 includes a function generator 4, a first digital multimeter (DMM1) 6, and a second digital multimeter (DMM2) 8 connected to an Ethernet 10. The system 2 should not be construed to include only such devices 4, 6, 8; the system 2 may include other devices that are common in a testing environment such as power supplies, oscilloscopes, spectrum analyzers, network analyzers, signal generators, signal analyzers, switch matrices, etc. It should also be noted that the devices 4, 6, 8 may be connected to other types of wired or wireless networks. The method may also be implemented in systems that are non-testing related, such as but not limited to, networked control systems, industrial automation systems, computer networks, and telecommunication systems. Consequently, the devices may include robots, controllers, servers, routers, switches, workstations, personal digital assistants, mobile phones, and the like. The system may also be implemented in a single piece of equipment. In such a case, the devices may be separate cards that are connected to a common bus in the equipment, or the devices may be separate hardware or software modules.

In the system 2 in FIG. 1, the function generator 4 and the DMMs 6, 8 are LXI compliant devices. More specifically, the function generator 4 and the two DMMs 6, 8 are LXI Class B devices, each of which includes a standardized LAN interface. These devices 4, 6, 8 are capable of inter-device communication and are thus capable of sending and receiving peer-to-peer messages. These messages can contain a timestamp representing the time of occurrence of some event. Each of the function generator 4 and the DMMs 6, 8 includes a IEEE 1588 clock and supports the Precision Time Protocol (PTP) defined in the IEEE 1588-2002 standard. Supporting the IEEE 1588 standard enables these devices 4, 6, 8 to have a sense of time and thus allows the precise synchronization of the devices. Accuracy of time within the nanosecond range can be achieved by using hardware generated timestamps in the devices 4, 6, 8. The devices can accept user generated code that can manipulate timestamps in the event messages.

During use for measuring the root-mean-square (RMS) power consumed by a DUT 32 at a predetermined time T3 (FIG. 7) in response to a given stimulus signal, the function generator 4 is operable to apply the stimulus signal to the DUT 32. When the stimulus signal stabilizes or settles after some time, the DMMs 6, 8 make their respective voltage and current measurements at the predetermined time T3. These measurements are required to be taken simultaneously close to or at the exact predetermined time T3 to avoid any discrepancy. The sequence 40 (FIG. 7) of operations in the function generator 4 and the DMMs 6, 8 to ensure that the measurements are taken at least substantially close to the predetermined time T3 will be described in more detail shortly.

Figure 6:
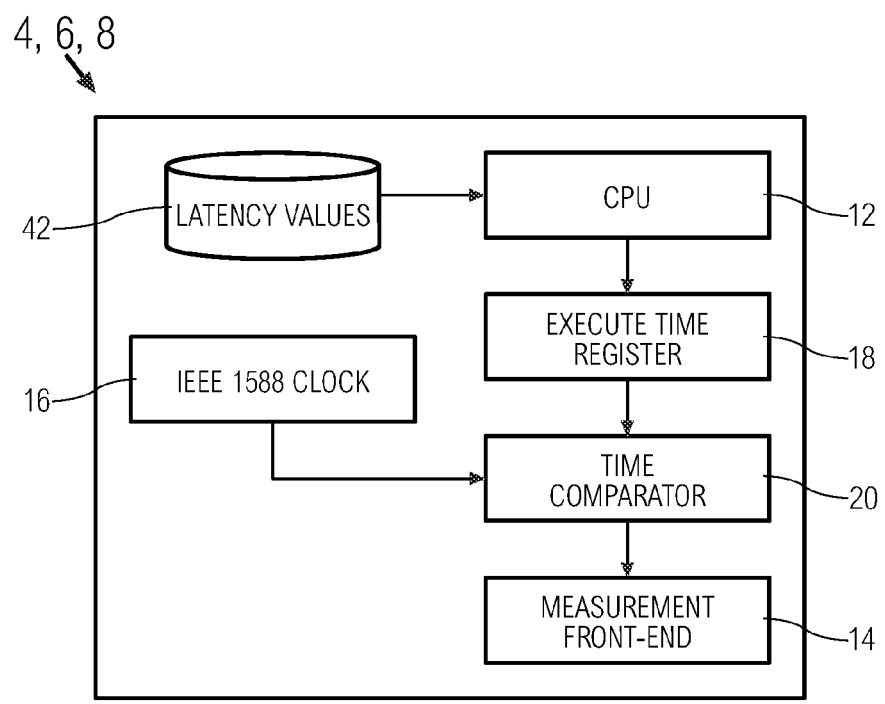
FIG. 6 is a block diagram of each of a function generator and two DMMs communicatively coupled to one another as shown in FIG. 1 according to an embodiment of the invention.

With reference to FIG. 6, each of the devices 4, 6, 8 includes functional components such as a central processing unit (CPU) 12, an execute time register 18, a time comparator 20, an IEEE 1588 clock 16, a device front end 14 and a database 42 of device latency values. These functional components may be separate hardware components or implemented in other hardware components that are not shown. These hardware components that are not shown include a random access memory (RAM), a read only memory (ROM), a non-volatile storage unit and other peripheral devices connected to the CPU 12 via an internal bus (all not shown). The bus carries data signals, control signals and power to the various components of each device 4, 6, 8. The non-volatile storage unit may be a floppy disk, a compact disc (CD), a chip card or a hard disk. The other peripheral devices may include a display, a keyboard, a mouse, and other device-specific components (all not shown). The display may be a video display, LCD display, touch-sensitive display, or other display types. The ROM or the non-volatile storage unit may serve as a program storage device for storing a program of instructions that is executable by the CPU for implementing the respective operations of the sequence 40. The program may be implemented in any high level or low level programming languages.

Figure 7:
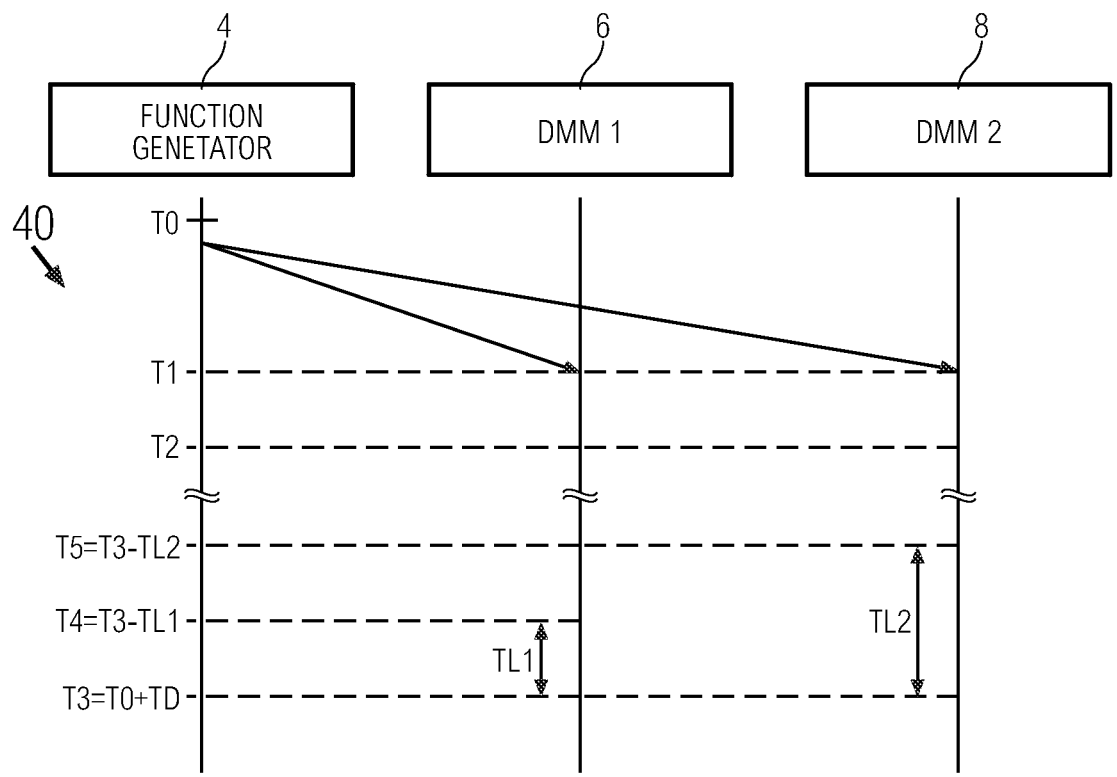
FIG. 7 is a drawing showing a sequence of operations in the function generator and the DMMs in FIG. 6 when making the measurement in FIG. 5.

The sequence 40 of operations implemented in the function generator 4 and the DMMs 6,8 will be described next with the aid of FIG. 7. The sequence 40 starts in the function generator 4 when the function generator 4 is operated to start the RMS power measurement on the DUT 32. The function generator 4 outputs a stimulus signal to the DUT 32 and sends an event message to each of the DMMs 6, 8. The event message includes a time T0 indicating the time at which the stimulus signal is generated in the function generator 4. This time T0 may also be any suitable time, such as the time the stimulus signal has settled or is expected to settle. The DMMs 6, 8 are able to determine from this time T0 in the event message, a predetermined time T3 at which the DMMs 6, 8 are required to execute their respective measurement tasks.

The sequence 40 of operations next moves to the DMMs 6, 8 where each DMM 6, 8 receives the event message at time T1 sent by the function generator 4. It is more likely that the DMMs 6, 8 receive the event message at different times. For simplicity, the DMMs 6, 8 are shown to receive the event message at the same time T1. Each DMM 6, 8 then obtains a time of initiation of execution of the measurement task based on the time T0 in the event message. In the prior art, this time of initiation is a time T3 given by a time delay TD after the time T0 (i.e. T3=T0+TD). The time delay TD is some application specific delay and can take on any user-specifiable value. This application specific delay may, for example, be a time interval that is added to a reference time, such as time T0 published by another device, to obtain a later time than time T0 at which a user requires a specific device or all devices to execute a respective task. For example, if a device starts a test at T0. Then a first power supply may have a time delay TD of 10 msec so that the first power supply turns on +5V at T0+10 ms. Another power supply may have a time delay TD of 20 msec and accordingly turns on +10V at T0+20 ms. In the embodiment in FIG. 7, the time delay TD may be a time at which the stimulus signal settles if the time T0 is the time at which the function generator 4 generates the stimulus signal. According to this embodiment, the time of initiation T3 in DMM1 6 is advanced by the device latency TL1 obtained from the database 42 to result in an advanced initiation time T4. Multiple latency times of DMM1 may be stored in the database. These latency times may be dependent on ambient temperature, age of the device 6, etc. The advanced initiation time T4 is given by T3−TL1. This device latency time TL1 is the time between the initiation of execution of a measurement task that performs the measurement and the actual measurement by the front end 14 of the DMM1 6. In this embodiment, the initiation time is the time at which the front end 14 is triggered to make the measurement and consequently the device latency TL1 is largely latency due to the hardware transmission and propagation times in the front end 14. The latency time TL1 may include software latency. This device latency time of a DMM 6, 8 may be factory calibrated and hard coded or hardwired in the device 6, 8. Alternatively, the device 6, 8 may periodically calibrate the latency time using the IEEE1588 clock to account for aging of the device 6, 8 etc. The DMM1 6 loads this trigger time/initiation time T4 in the execute time register at a time T2. When the time provided by the clock 16 reaches the time T4, the time comparator 20 generates a trigger signal for the front end 14 to initiate the measurement task to make the measurement.

In this manner, the initiation of the execution of the measurement task is advanced by the device latency time TL1 in DMM1 6. DMM2 8 will advance the time of initiation of its measurement task in a similar manner. Assuming DMM2 8 has a device latency time TL2 which is longer than the DMM1 device latency time TL1. DMM2 will obtain the advanced initiation time T5 given by T5=T3−TL2 and load this time T5 in the execute time register of DMM2 8. At time T5, which is before time T3 and time T4, the time comparator 20 generates a trigger signal for the front end 14 of DMM2 8 to initiate the measurement task to make the measurement.

At the predetermined time T3 (where T3=T0+TD), both the DMMs 6, 8 would then make their respective actual measurements. That is, DMM1 6 actually measures the voltage and DMM2 26 actually measures the current at the DUT 30 at the predetermined time T3 although the respective measurement tasks were started at earlier times T4 and T5 by the respective front-ends 14. Based on these voltage and current measurements, the power at the DUT 32 at time T3 for the stimulus signal may be determined. In this manner, both DMM measurements are taken at least substantially close to each other in time and also at the predetermined time T3 expected by the function generator 22.

Figure 8:
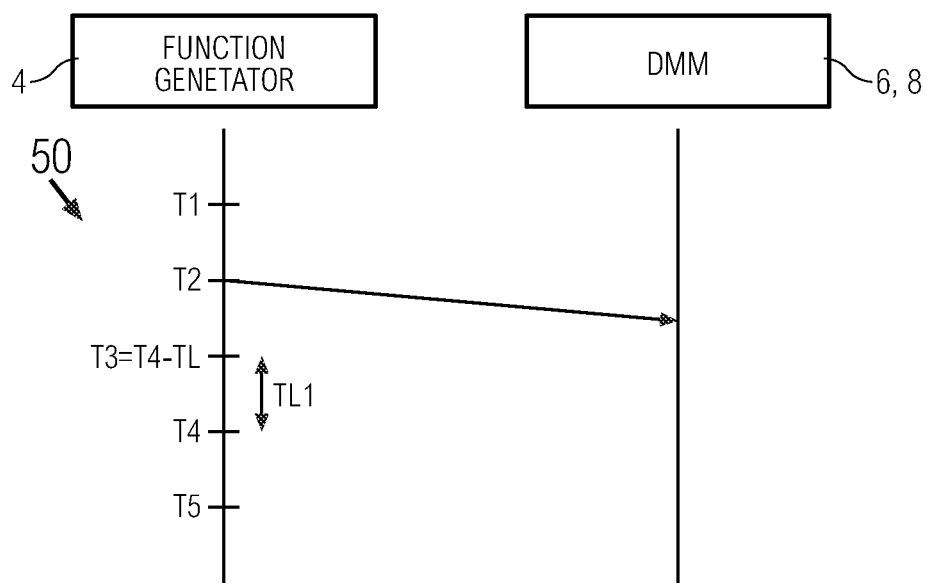
FIG. 8 is a drawing showing a sequence of operations, according to another embodiment of the invention, in the function generator in FIG. 6 when sending an event message to the DMM.

This advancement of initiation of execution of a task/action is not restricted to implementation on the DMMs 6, 8; it is also possible for this time advancement to be implemented in the function generator 4 for generating correct timestamps for the event messages. The function generator 4 has the same functional units as the DMMs 6, 8. With reference to FIG. 8, the sequence 50 of operations in the function generator 4 for generating a stimulus signal and sending an event message regarding the generation of the stimulus signal is described. At time T1, the CPU in the function generator 4 executes code to instruct the front end 14 thereof to generate a stimulus signal at a later time T4. At time T2, the CPU sends an event message to the DMMs that includes the time T4. In the prior art, the front end 14 of the function generator 4 will be triggered to generate the stimulus signal only at time T4. And due to latency in the front end 14 as described above, the stimulus signal would not be generated at time T4 but a short interval later (not shown). Instead of loading the time T4 in the execute time register 18 as would have been the case in the prior art, the CPU 12 advances this time for initiating the generation of the stimulus signal by the device latency time TL. In other words, the CPU 12 determines a time T3 given by T4−TL. The CPU 12 loads this time T3 into the execute time register 18. When the time of the IEEE1588 clock 16 reaches the time T3, the time comparator 20 generates a trigger to cause the front end 14 to initiate generation of the stimulus signal. That is, the initiation of stimulus signal generation is brought forth from the time T4 to an earlier time T3 so that signal generation actually occurs at the predetermined time T4. The time T4 included in the event message sent at time T2 would thus accurately reflect the actual time of stimulus signal generation. It is known that the stimulus signal will take time to settle, for example, at time T5. This signal settling time is stored in the function generator 4. It is possible for the function generator 4 to send the event message with the time T5 instead of the time T4. From the above description, it can be seen that the function generator 4 need not wait till the time T4 or the time T5 to send an event message to the DMMs 6, 8. The event message can be sent to the DMMs 6, 8 early, preferably as soon as T4 is known, so that the DMMs 6, 8 are given ample time to get ready to make the actual measurements as soon as the stimulus signal settles.

In the above described sequence 40, each DMM 6, 8 is thus able to make an actual measurement close to or exactly at the predetermined time T3 expected by the function generator 22. Each DMM 6, 8 thus includes a means that advances the initiation of the execution of a measurement task by its latency time. This means when implemented in software is stored in the ROM or the non-volatile storage unit. Alternatively, this means may be implemented in firmware, hardware (not shown), or a combination thereof. The function generator 4 includes a means that sends the DMMs 6, 8 a time T0 from which the predetermined time T3 is obtainable. Sending of the time T0 in the event message is timed to be received by the each DMM 6, 8 to allow sufficient time for the DMM 6, 8 to advance the initiation of execution of the measurement task by its latency time. In other words, DMM1 and DMM2 have to receive the event message before time T4 and time T5 respectively to avoid any causality violation.

Although the present invention is described as implemented in the above described embodiments, it is not to be construed to be limited as such. For example, it is described that the function generator 4 and DMMs 6, 8 are LXI compliant devices connected via an Ethernet. This is not necessarily so; the invention may be implemented with devices that can communicate with each other over any network including but not limited to a Controller Area Network (CAN). Furthermore, protocols used by these devices for time synchronization may also include, among others, the Network Time Protocol (NTP).

As another example, it should not be construed that the invention is applicable only for synchronizing the execution of measurements on two devices. It is possible that the invention be implemented in only a single device to perform any action at a stipulated time. This stipulated time for this single device also need not be receivable from another device but may be entered into that one device by any suitable means.

As yet another example, it should not be construed that the time in the event message should indicate only a stimulus signal generation time or settling time. The time in the event message may also be the predetermined time the function generator expects the DMM measurements to be made. Moreover, this time may be sent via a command or a script instead of the described message event.

What is claimed is:

1. A method of executing an action at a predetermined time by a device, wherein the device has a latency time between initiation of the execution of the action and the actual execution of the action, the method comprising;
   storing latency time values for different conditions of the device in a database of the device; and
   advancing the initiation of the execution of the action by the latency time.

2. A method according to claim 1, wherein the device comprises a first device that is communicatively coupleable to a second device via a communication network, and wherein the method further comprises the first device receiving from the second device one of a time indicating the predetermined time and a time from which the predetermined time is obtainable.

3. A method according to claim 2, wherein receiving from the second device a time comprises receiving the time from the second device in one of a script, an event message and a command.

4. A method according to claim 1, wherein the latency time comprises one of a latency time that is hardcoded in the device and a latency time that is hardwired in the device.

5. A method according to claim 1, wherein the latency time comprises at least one of a hardware latency time and a software latency time.

6. A method according to claim 1, wherein the device comprises a measurement instrument and wherein the action comprises a measurement.

7. A method according to claim 1, further comprising:
the device receiving an event message that includes one of a time at which an event occurred and a time at which an event will occur, the event necessitating the performance of the action by the device; and
wherein the time of actual execution of the action is given by a predetermined delay after the time in the event message.

8. A method according to claim 7, further comprising:
loading an advanced initiation time in an execute time register of the device before the advanced initiation time.

9. A device for executing an action at a predetermined time, wherein the device has a latency time between initiation of the execution of the action and the actual execution of the action, the device comprising;
a database configured to store latency time values for different conditions of the device; and
a means that advances the initiation of the execution of the action by the latency time.

10. A device according to claim 9, wherein the device comprises a first device that is communicatively coupleable to a second device via a communication network, and wherein the first device further comprises a means that receives from the second device a time indicating one of the predetermined time and a time from which the predetermined time is obtainable.

11. A device according to claim 10, wherein the means that receives from the second device a time comprises a means that receives the time from the second device in one of a script, an event message and a command.

12. A device according to claim 9, wherein the latency time comprises one of a latency time that is hardcoded in the device and a latency time that is hardwired in the device.

13. A device according to claim 9, wherein the latency time comprises at least one of a hardware latency time and a software latency time.

14. A device according to claim 9, wherein the device comprises a measurement instrument and wherein the action comprises a measurement.

15. A device communicatively coupleable to a receiving device via a communication network for requesting the receiving device to execute an action at a predetermined time, wherein the receiving device has a latency time between initiation of the execution of the action and the actual execution of the action, the device comprising a means that sends the receiving device a time indicating one of the predetermined time and a time from which the predetermined time is obtainable, the time being timed to be received by the receiving device to allow sufficient time for the receiving device to advance the initiation of the execution of the action by the latency time,
wherein the device and the receiving device respectively include databases configured to store latency time values for different conditions of the devices.

16. A device according to claim 15, wherein the means that sends the receiving device a time value comprises a means that sends the receiving device a time value via one of a script, an event message and a command.

17. A system comprising:
a device having a latency time between initiation of the execution of an action and the actual execution of the action, the device comprising
a database configured to store latency time values for different conditions of the device, and
a means that advances the initiation of the execution of the action by the latency time.

18. A system according to claim 17, wherein the device comprises a first device and the system further comprises a second device that is communicatively coupleable to the first device via a network, the second device comprising a means that sends a time indicating one of a predetermined time for the first device to execute the action and a time from which the predetermined time is obtainable; and wherein the first device further comprises a means that receives the time value sent by the second device.

19. A system according to claim 18, wherein the means that sends and the means that receives comprises a means that sends one of a script, an event message and a command and a means that receives the one of a script, an event message and a command respectively.

* * * * *